(12) United States Patent
Moutinho et al.

(10) Patent No.: US 8,623,972 B2
(45) Date of Patent: Jan. 7, 2014

(54) STYRENE-BUTADIENE COPOLYMERS, PROCESS FOR THE PREPARATION THEREOF AND HIGH COHESION ADHESIVE COMPOSITIONS

(75) Inventors: Marcus Tadeu Moura Moutinho, Rio de Janeiro (BR); Manoel Remigio dos Santos, Duque de Caxias (BR); Rinaldo Farias Luz, Rio de Janeiro (BR); Humberto Rocha Lovisi, Icarai-Niteroi (BR); Mauro Eduardo Costa Braz Pinto, Rio de Janeiro (BR)

(73) Assignee: Lanxess Elastomeros Do Brasil S.A., D Caxias RJ (BR)

( * ) Notice: Subject to any disclaimer, the term of this patent is extended or adjusted under 35 U.S.C. 154(b) by 0 days.

(21) Appl. No.: 13/359,656

(22) Filed: Jan. 27, 2012

(65) Prior Publication Data

US 2012/0129975 A1        May 24, 2012

Related U.S. Application Data

(63) Continuation of application No. 12/594,448, filed as application No. PCT/IB2008/000833 on Apr. 7, 2008, now abandoned.

(30) Foreign Application Priority Data

Apr. 5, 2007    (BR) ...................................... 0701521

(51) Int. Cl.
*C08F 236/10*    (2006.01)
*C08F 212/10*    (2006.01)
*C08F 2/24*      (2006.01)
*C08F 2/44*      (2006.01)

(52) U.S. Cl.
USPC ............. 526/82; 526/89; 526/347; 526/348.2

(58) Field of Classification Search
USPC .................... 524/836; 526/82, 89, 347, 348.2
See application file for complete search history.

(56) References Cited

U.S. PATENT DOCUMENTS 5,153,255 A      10/1992    Kondo et al.

FOREIGN PATENT DOCUMENTS

| EP | 0050226 A1 | | 4/1982 |
| EP | 50226 A1 | * | 4/1982 |
| GB | 2137212 A | | 10/1984 |
| WO | 2008019461 A1 | | 2/2008 |

* cited by examiner

*Primary Examiner* — Kelechi Egwim
(74) *Attorney, Agent, or Firm* — Michael A. Miller

(57) ABSTRACT

The present invention relates to styrene-butadiene copolymers (SBR) that are prepared using aqueous emulsion polymerization technology and are intended for the adhesive and sealing industry, being particularly useful in the preparation of contact adhesives and pressure-sensitive adhesives (PSA) and widely applicable in the footwear and furniture industries. The use of this kind of elastomer in processes for preparing adhesives, having an aqueous or solvent base, provides high cohesion to adhesive compositions without compromising or jeopardizing the adhesion. The present invention is also intended to protect the process for obtaining SBR copolymers, simultaneously comprising: aqueous emulsion polymerization at high temperatures, the use of a specific surfactant and the maintenance of the Mooney viscosity and the combined styrene content in the copolymer in high ranges. Another object of the present invention application is the protection of adhesive compositions that are obtained from SBR copolymers, either in solid or latex form.

9 Claims, No Drawings

STYRENE-BUTADIENE COPOLYMERS, PROCESS FOR THE PREPARATION THEREOF AND HIGH COHESION ADHESIVE COMPOSITIONS

CROSS REFERENCE TO RELATED PATENT APPLICATIONS

The present patent application is a continuation of U.S. patent application Ser. No. 12/594,448, with a date of completion of all requirements Aug. 27, 2010, currently pending, which claims the right of priority under 35 U.S.C. §119 (a)-(d) and 35 U.S.C. §365 of International Application No. PCT/IB08/00833, filed 7 Apr. 2008, which is entitled to the right of priority of Brazilian Patent Application No. PI0701521-6 filed on 5 Apr. 2007.

The present invention refers to styrene-butadiene copolymers (SBR) that are prepared using aqueous emulsion polymerization technology and are intended for the adhesive and sealing industry, being particularly useful in the preparation of contact adhesives and pressure-sensitive adhesives and widely applicable in the footwear and furniture industries. The use of this kind of elastomer in processes for preparing adhesives, having an aqueous or solvent base, provides high cohesion to adhesive compositions without compromising the adhesion.

The present invention is also intended to protect the process of obtaining SBR copolymers, simultaneously comprising: aqueous emulsion polymerization at high temperatures, the use of a specific (surfactant) and the maintenance of the Mooney viscosity and the combined styrene content in the copolymer in high ranges. Another object of the present patent application is the protection of adhesive compositions that are obtained from SBR polymers, either in solid or latex form.

By definition, adhesives are substances capable of keeping two materials together by bonding their surfaces. Over recent decades, technological advances in bonding different materials have meant that adhesives have appeared on the market as an important class of materials.

The efficiency of an adhesive is mainly measured by its adhesion and cohesion properties. Adhesion is a surface phenomenon that implies in the permanent union of two materials, by intermolecular forces. On the other hand, cohesion is defined as the state in which the particles of an adhesive are kept joined, by means of primary and secondary valence forces.

Adhesion and cohesion may be jeopardized not only by the inefficiency of the adhesive composition, but also by the intrinsic characteristics of the substrate, causing what is known as adhesive or cohesive failure. Adhesive failure is defined as being the rupture of the interfacial link between the adhesive and the adherent, whereas cohesive failure occurs when the fracture tension allows the permanence of layers of adhesives in both substrates.

The substrate is the material to be bonded and, consequently, its nature and its surface treatment are fundamental factors for the adhesive process. Porosity, acidity, alkalinity, etc. of the substrate are features that influence the bonding result. The natures of the interphase and the interface are also critical factors for this process. The interphase is the region near the point of contact between the adhesive and the substrate, and the interface, also called the connecting layer, is the contact area between the surface of one material and the surface of another. Hence the importance of selecting the adhesive, since it must be compatible with the substrate.

Typically, the elastomer is the main ingredient used in adhesive compositions, since it is the polymeric base of said compositions, particularly the compositions of contact adhesives and pressure-sensitive adhesives. Among the polymeric materials most used in adhesive compositions are natural rubber, polychloroprene, nitrilic rubber and butadiene and styrene rubber (SBR).

Butadiene and styrene rubber does not have the choice adhesive properties of natural, nitrilic or polychloroprene rubber, however it has lower production and commercialization costs than these elastomers. Beneficially, when compared to the adhesives of natural rubber, the SBR adhesives have lower resistance to heat and lower water absorption, and can also be processed in a more suitable temperature range. However, in relation to adhesives with a nitrilic and polychloroprene rubber base, they do not have the same resistance to oils, solvents and oxidation. One of the most important characteristics of the present invention is the possibility of total or partial substitution of these polymers, generating improvement in the properties and significant cost reduction of the final adhesive product, particularly in some applications of polychloroprene in the footwear and furniture sectors.

The content of combined styrene present in butadiene and styrene rubber is another critical variable for the adhesion process. The increase in the combined styrene content in the SBR copolymer molecule increases its polarity, providing improved compatibility with the varied components of the adhesive composition and the substrate, thus increasing the range of possibilities for the formulator of the adhesive and increasing the possibility of using the formulated adhesive in various types of applications, from bonding of metallic materials, to woods, agglomerates and various kinds of plastics.

The viscosity of the adhesive, the irregularities in the surface of the substrate, besides the presence of contaminants thereon, are other critical factors for the efficiency of the adhesion. The adhesive has finite viscosity, which generally varies rapidly over time, and so cannot overcome the barriers formed by the contaminants and irregularities present on the surface of the substrate. Accordingly, tension points may be created causing fractures on the interfaces between the adhesive and the adherent, thus compromising the bonding performance.

Adhesives can be classified as structural and non-structural adhesives. The expression structural adhesive is generally used to describe adhesives that remain unaltered throughout their entire useful life and that have high shear strength (typically over 7.0 MPa, pursuant to the ASTM D-1002 standard) and have good resistance to intemperate weather. In this kind of adhesive, the cohesion force between the materials submitted to bonding is a critical property that is a measure of its excellence. Structural adhesives include those with a therm-origid resin base such as epoxy, urethane and acrylic.

Non-structural adhesives, compared to structural adhesives have a lower cohesive force and shorter life as a material bonding agent. Said adhesives are normally used for temporary fixing or bonding of weak substrates. They can be applied easily, are affixed quickly and are used in fast bonding lines, operations that require moderate levels of cohesive force in the final bonding (less than 7.0 MPa) and milder environmental use conditions, since they present relative resistance to inclement weather. The most common types of non-structural adhesives are PSA (Pressure-Sensitive Adhesives), contact adhesives, thermoplastic and elastomeric emulsions and hot melt adhesives—which are solid adhesives, based on thermoplastic polymers that either have tack or not and that are applied in cast state, gaining resistance as they solidify.

Adhesives based on polymeric materials, besides shear strength, must have peel strength, creep resistance and controlled viscosity.

In adhesive compositions, the elastomer and the adhesion enhancer resin are generally two important components. SBR rubbers require the incorporation of tack agents, that favor the adhesion property.

Adhesion enhance resins are normally resins of natural origin, such as colophony (pitch) and derivatives thereof, hydrocarbon and terpenic resins, which are present in concentrations ranging from 100 to 300 phr (per hundred rubber) compared to the concentration of the chosen elastomer.

The adhesive compositions are classified as having an aqueous or solvent base. Solvent base adhesives are generally prepared by dissolving the elastomer in aliphatic or aromatic hydrocarbonate solvents, from petroleum parts, chlorate or chlorofluorate solvents, esters and ketones.

Generally, solvents used for elastomers of the styrene-butadiene copolymer (SBR) kind are aliphatic hydrocarbonates such as n-hexane, n-heptane, n-octane; and aromatic hydrocarbonates such as toluene, benzene, and o-xylene.

Besides these components, other additives are also used, such as: loads, antioxidants, pigments, fungicides, foam preventives, plasticizers, wetting agents, etc.

Typically, the final adhesive, having either an aqueous or solvent base, contains from around 3 to around 30% by weight of the chosen elastomer.

Generally, the polymers can be prepared by emulsion polymerization, suspension, solution or mass. However, emulsion polymerization and suspension techniques are the most used due to the ease of controlling the viscosity of the reaction medium and the highest conversion of monomers, when compared to other techniques. Polymerization can be carried out by a batch process, a continuous process or a semi-continuous batch feed process, in which one or more reaction components can be added during the course of the process. The reaction temperatures are normally in the range of around −10° C. and 100° C., preferably in the range of 5° C. and 80° C. Polymerization should be conducted in the absence of air or oxygen.

Aqueous emulsion polymerization is the technique preferably used for preparing styrene-butadiene copolymers (SBR). Emulsion polymerization can be initiated by means of free radical generating agents, such as: organic peroxides and hydroperoxides, such as benzoyl peroxide, dicumyl peroxide, t-butyl peroxide, cumyl hydroperoxide, p- methane hydroperoxide, etc.; azo compounds, such as azobisisobutironitryl, azobisisobutylamidin, etc.; persulfates, such as ammonium persulfate, potassium and sodium; and ultraviolet light. Normally, the compounds that initiate or generate free radicals are combined with redox systems or the ultraviolet light with photo-sensitive agents, such as, benzophenone and diazo organic compounds.

Typical emulsion polymerization uses persulfate salts or an organic peroxide as initiator, including a redox system, water adjusted to the desired pH value with acids or bases, usually tamponed with inorganic salts, and also active anionic, cationic or non-ionic wetting agents. It must also be pointed out that the state of the art relating to emulsion polymerization discloses the use of chain transfer agents as an optional component of the reaction. Conventionally used agents are, for example, mercaptans.

The final product of emulsion polymerization is in the form of a latex and must undergo a coagulation process when it is desired to obtain a rubber or solid polymer. Typical coagulation processes use polyvalent metal and alcohol salts, such as, for example: magnesium sulfate, calcium chlorate, methanol and isopropanol. Agglomeration techniques are also used. The polymer obtained is usually washed and dried.

Generally, synthetic copolymer butadiene and styrene (SBR) elastomers do not have per se sufficiently suitable adhesion and cohesion properties for certain industrial sectors, and so must be modified to achieve the required performance.

Patent application GB 2.137.212 describes a process for preparing a stable adhesive dispersion of modified polymer comprising the formation of a mixture containing:

(a) styrene at a level of 10% to 45% by weight of total active solids;

(b) butadiene at a level of 40% to 90% by weight of total active solids;

(c) other monomers, at levels of 0 to 20% by weight of total active solids, selected from acrylonitrile, methyl methacrylate, vinyl acetate, isoprene or an alkyl acrylate having 3 to 8 carbon atoms in the alkyl radical, or any acrylic monomer;

(d) a synthetic adhesion enhancer resin or a rosin derivate at a level of 5% to 55% by weight of the total active solid; and polymerizing monomers (a), (b), and optionally (c) in the presence of adhesion enhancer (d) of an aqueous solution containing one or more emulsifiers and polymerization initiators.

The polymerization reaction for the preparation of the copolymer is carried out in a single-step process, at a temperature and pressure typically used in emulsion polymerization. The emulsifiers used may be any compound that decreases the surface tension, such as ethylene oxide derivatives of an alkyl phenol, a fatty acid or an alcohol, sodium lauryl sulphate, a sulphated or sulphonated ethylene or propylene oxide derivative of an analkyl phenol, a fatty acid or a fatty alcohol and also, but not necessarily, rosin soaps. The end product of polymerization can be used to form a general use pressure-sensitive adhesive (PSA) for labels and adhesive tapes. According to the examples set forth in patent GB 2.137.212, it is estimated that on average the percentage of styrene is in the range of 12.5%, that of butadiene 37.5% and that of rosin ester derivatives 50%. However, said document does not address viscosity control of the elastomer or end adhesive, nor applications in the footwear and furniture industries.

The present invention describes new styrene-butadiene copolymers (SBR) having superior adhesion and cohesion properties that are used in innumerous final applications, either in the form of latex or in the form of coagulated rubber. The new copolymers developed by the applicant present a high styrene concentration in the range of 45 to 75%, and high Mooney viscosity, in the range of 85 to 150 and are particularly useful for preparing contact adhesives and pressure-sensitive adhesives.

The use of the SBR copolymers of this invention provides superior properties to adhesive compositions, ensuring improved performance in the bonding of various substrates, such as PVC, thermoplastic rubbers (TR), leather, reconstituted leather, wood, foams, expanded polystyrene, rock wool, glass wool, galvanized substrates, concrete, etc. The present invention is also intended to meet the need to reduce costs, providing an excellent alternative for the furniture and footwear industries, among others.

It has been surprisingly discovered that through a hot emulsion polymerization process, the suitable selection of the surfactant, the higher concentration of styrene and the increased Mooney viscosity in the copolymer, it is possible to obtain styrene-butadiene copolymers (SBR) that result in the maximization of the adhesion and cohesion properties in the adhesive compositions and, consequently, the application of said compositions as an excellent alternative for the footwear and furniture industries.

The present invention is also intended to protect the process of obtaining SBR copolymers, simultaneously comprising: aqueous emulsion polymerization at high temperatures; the use of a surfactant of the resinous soap kind, which is incorporated in the styrene-butadiene copolymers in acid form, acting as an adhesive agent; the control of the Mooney viscosity in the range of 85 to 150 and the styrene content in the range of 45 to 75%.

The hot aqueous emulsion polymerization process is normally carried out at temperatures ranging from 40° C. to 65° C., preferably from 45° C. to 60° C. The Mooney viscosity should be maitained preferably, ranging from between 85 to 150; more preferably between 100 to 130. The total solids content is in the range of 20 and 40%, preferably between 22 and 30% and the combined styrene content in the range of 35 to 75, preferably between 45 and 65; more preferably between 50 and 60.

According to the present invention, the emulsion polymerization process for preparing the SBR copolymer having differentiated adhesion and cohesion properties is characterized by comprising the following steps:

1—purging the reactor with gaseous nitrogen to completely remove oxygen from the medium, which would inhibit the process of initiation and spreading of the reaction;

2—adding a preheated emulsifier at temperatures in the range of 40° C.-60° C.;

3—adding monomers (styrene and butadiene) and the chain transfer agent;

4—adding a previously prepared free radical initiator solution;

5—polymerizing at temperatures in the range of 40° C. to 65° C. until an SBR copolymer latex is formed, the Mooney viscosity of which is controlled to be within the range of 85-150, and the total solids content is maintained in the range of 20-40%;

6—stopping polymerization, after 60%-80% conversion of monomers, by adding a reaction shortstop;

7—removing unreacted butadiene and styrene monomers;

8—optionally, coagulating the latex by adding coagulants, such as aqueous solutions of inorganic salts and acids to the coagulation container; and, 9—washing and drying said SBR copolymer, which contains the surfactant, the resinous soap, incorporated in its acid form.

The emulsifier is the mixture of resinous acid with the other components, and is prepared in a closed vessel. The water used is demineralized water, since the presence of ions may cause insolubilization of the surfactant or emulsifier, whereby deviations in the reaction progress and/or destabilization of the formed latex may occur. Water is preheated to 60° C.-70° C. prior to the addition of said surfactant thus improving dissolution kinetics of the surfactant. Said surfactant is present in the range of 2.0 to 8.0 parts per hundred parts of monomer (phm), preferably in the range of 4.0 to 6.0 phm. After said surfactant is completely solubilized, a dispersing agent is added until complete solubilization thereof.

The dispersing agent that is a dioctyl solfosuccinic acid salt acts in stabilizing the formed latex and is present in concentrations ranging from 0.1 to 2.5 phm, preferably 0.7 to 1.5 phm. Finally, a pH buffer in concentrations ranging from 0.2 to 1.5 phm, preferably 0.5 to 1.0 phm is added. Potassium phosphate, sodium acetate and sodium bicarbonate are the most widely utilized and preferred compounds for the present invention. The final pH of the emulsifying mixture must be adjusted to 10 to 11.5. Generally, phosphoric acid is used for pH decrease and sodium hydroxide for pH increase. Said emulsifying mixture is maintained at a temperature of 60 to 70° C.

Free radical generators, which can be used in the process of the present invention are those widely known in the art. The concentration of free radical generators, in accordance with the present invention, is in the range of 0.015 to 1.5 phm, preferably 0.1 to 0.8 phm.

The Chain transfer agent is present in the reaction mixture in an amount of 0.01 to 1.0 phm, preferably 0.05 to 0.6 phm, more preferably 0.1 to 0.2 phm, and is selected from alkyl and/or aryalkyl mercaptans, such as n-octyl mercaptan, n-dodecyl mercaptan, t-octyl mercaptan, t-dodecyl mercaptan, tridecyl mercaptan, tetradecyl mercaptan, hexadecyl mercaptan and the like, and mixtures thereof. The preferred chain agents are t-dodecyl mercaptan and n-dodecyl mercaptan.

Chain shortstops used in the process of the present invention are those typically used in conventional polymerization processes. Said chain shortstops are present in concentrations ranging from 0.015 to 15 phm, preferably 0.1 to 8 phm.

The product formed in the reactor is a latex that when necessary must be subjected to a coagulation process in order to become a solid polymer. Said coagulation process consists of adding salts of metals having valences greater or equal to two, the preferred salts being calcium chloride, magnesium chloride or aluminum sulfate. Said salts insolubilize the surfactant, thereby destabilizing particles and enhancing coalescence between said particles. A mixture of mineral acids with monovalent salts, such as, for example, sulfuric acid and sodium chloride, may also be used. After coagulation, the polymer is washed and dried. Typically, prior to coagulation, antioxidants are added to protect the polymer.

Thus new styrene-butadiene copolymers (SBR) are provided, having superior adhesion and cohesion properties. They are used in innumerous final applications, either in the form of latex or in the form of coagulated rubber. The new copolymers developed by the applicant have a high concentration of styrene, in the range of 45 to 75%, and high Mooney viscosity, in the range of 85 to 150 and are particularly useful for preparing contact adhesives and pressure-sensitive adhesives.

The present invention also describes adhesive compositions that are formulated with the styrene-butadiene copolymers (SBR) of this invention, hot polymerized, in the presence of an adhesion enhancer emulsion system, having a high content of combined styrene and high Mooney viscosity, which are intended for application in the sectors of leather and artifacts thereof, wood, furniture, civil construction, footwear, among others.

The adhesive compositions of the present application consist of 8 to 20% of the SBR as defined in the applicant's invention, preferably 12 to 16%; from 8 to 24% of tack agent; from 0.5 to 1.5% of protection agent and from 54 to 84% of solvents. The tackifier, protection and solvent agents are those used in the adhesives industry in general.

EXAMPLES

The examples set forth below are intended to illustrate the process of obtaining SBR copolymers, as well as the adhesive compositions that are the subject matter of this invention. They are also intended to demonstrate the final characteristics of the adhesive compositions, comparatively to the state of the art closest to the invention, particularly that disclosed by British patent GB-2173212A.

Example 1

Invention

I—Preparing an SBR copolymer

In this experiment, the SBR copolymer was synthesized using the emulsion polymerization technique of this invention. Into a 20 liter capacity reactor, in a vacuum (around 600 mmHg) 6,150 g of water were added, 2,950 g of resinous soap emulsioned in water at 7%, 3,150 g of styrene, 1,850 g of butadiene and 5 g of n-dodecylmercaptan. The reaction mixture was heated to a temperature of around 50° C. and kept under agitation. Further ingredients added comprised 550 g of aqueous solution of potassium persulfate at 4%. The polymerization reaction was kept at a constant temperature of 50° C. for around 10 hours until a total solids content of latex of 21-22% was obtained and then 580 g of an aqueous solution of n-isopropylhydroxylamine at 4% was added. A sample of latex, presenting 55% of combined styrene and Mooney viscosity 120, was coagulated using a conventional technique and dried as described ahead.

II—Coagulation of the SBR latex

To obtain the solid elastomer, the SBR latex obtained in step I above was coagulated.

Into a 20-liter capacity stainless steel vessel, having a casing for steam heating, were placed 2,000 g of SBR latex. The latex was heated to around 65° C. under mechanical agitation and the phenolic-type antioxidant was added, so as to obtain around 1% by weight of antioxidant in the dry-based rubber. Under vigorous agitation, 600 ml of a sodium chlorate solution at 20% was added and then the coagulating agent was slowly added (sulphuric acid solution in water at 0.4%) until lumps of rubber were formed. Once the coagulation process had finished, washing with demineralized water began in order to withdraw the coagulation residues. Next, the lumps were placed in a stainless steel sieve for incubation drying with forced air circulation at 65° C. for 18 hours or until no humidity remained in the rubber lumps.

Example 2

Preparing the Adhesive Compositions

Adhesive composition A—SBR the subject matter of this invention

This composition comprised the use of the SBR obtained in Example 1, which is hotpolymerized, presenting 55% of combined styrene, Mooney viscosity 120 and 5% of resinous acid incorporated in the polymer.

The preparation of this adhesive, in a closed, Cowles-type mixer, made of stainless steel 316L, at ambient temperature (approximately 24° C.), comprised 79% of toluene, followed by agitation of the medium. This agitation continued throughout the adhesive preparation process. After adding the solvent, 1% of a mixture of antioxidants (phenolics and phosphates) was added. Next, 10% of the SBR of Example 1 was added, previously milled, in pieces measuring approximately 3 mm in diameter. After adding the copolymer, the system was cooled in order to ensure that a temperature of about 25° C. was maintained.

Then, 10% of glycerol ester was added, whose softening point is approximately 80° C., allowing homogenization for 90 minutes. The system was kept under agitation for 240 minutes, in order to achieve complete homogenization. At the end of this time, a sample was collected to determine the viscosity and subsequent adjustment thereof.

The final properties of the adhesive are demonstrated in Table 1.

Comparative adhesive composition A1—conventional SBR based on patent GB-2173212A This example reproduces an adhesive formulation based on the examples described in British patent GB-2173212A, which discloses the use of copolymers having combined styrene content in the range of 20 to 30% and typical Mooney viscosity in the range of 45 to 55.

The preparation of this adhesive, in a closed, Cowles-type mixer, made of stainless steel 316L, at ambient temperature (approximately 24° C.), comprised 79% of toluene, followed by agitation of the medium. This agitation continued throughout the adhesive preparation process. After adding the solvent, 1% of a mixture of antioxidants (phenolics and phosphates) was added. Next, 10% of the SBR was added, having a combined styrene content of 23.5% and Mooney viscosity of 52, previously milled, in pieces measuring approximately 3mm in diameter. After adding the copolymer, the system was cooled in order to ensure that a temperature of about 25° C. was maintained.

Subsequently, 10% of glycerol ester was added, whose softening point is approximately 80° C., allowing homogenization for 90 minutes. The system was kept under agitation for 240 minutes, in order to achieve complete homogenization. At the end of this time, a sample was collected to determine the viscosity and subsequent adjustment thereof.

The final properties of the adhesive are demonstrated in Table 1.

Adhesive composition B—SBR the subject matter of this invention

This composition uses the SBR obtained in Example 1, which is hot polymerized, presents 55% of combined styrene, Mooney viscosity 120 and 5% of resinous acid incorporated to the polymer.

The preparation of this adhesive, in a closed, Cowles-type mixer, made of stainless steel 316L, at ambient temperature (approximately 24° C.), 79% of toluene, followed by agitation of the medium. This agitation continued throughout the adhesive preparation process. After adding the solvent, 1% of a mixture of antioxidants (phenolics and phosphates) was added. Next, 10% of the SBR of Example 1 was added, previously milled, in pieces measuring approximately 3mm in diameter. After adding the copolymer, the system was cooled in order to ensure that a temperature of about 25° C. was maintained.

Next, 7% of non-reactive terpene-phenolic resin was added, whose softening point is approximately 140° C. and 3% of aromatic hydrocarbon resin, whose softening point is 140° C., allowing homogenization for 90 minutes. The system was kept under agitation for 240 minutes, in order to achieve complete homogenization. At the end of this time, a sample was collected to determine the viscosity and subsequent adjustment thereof.

The final properties of the adhesive are demonstrated in Table 1.

Comparative adhesive composition B1—conventional SBR based on patent GB-2173212A This example reproduces an adhesive formulation based on the examples described in British patent GB-2173212A, which discloses the use of copolymers having combined styrene content in the range of 20 to 30% and typical Mooney viscosity in the range of 45 to 55, but in the presence of a specific adhesion enhancer preferred by the applicant's invention.

The preparation of this adhesive, in a closed, Cowles-type mixer, made of stainless steel 316L, at ambient temperature (approximately 24° C.), 79% of toluene, followed by agitation of the medium. This agitation continued throughout the adhesive preparation process. After adding the solvent, 1% of a mixture of antioxidants (phenolics and phosphates) was added. Next, 10% of the SBR was added, previously milled, in pieces measuring approximately 3 mm in diameter. After adding the copolymer, the system was cooled in order to ensure that a temperature of about 25° C. was maintained.

Next, 7% of non-reactive terpene-phenolic resin was added, whose softening point is approximately 140° C. and 3% of aromatic hydrocarbon resin, whose softening point is 140° C., allowing homogenization for 90 minutes. The system was kept under agitation for 240 minutes, in order to achieve complete homogenization. At the end of this time, a sample was collected to determine the viscosity and subsequent adjustment thereof.

Below, the applicant sets forth a comparative table of the final properties of the adhesive formulated from the SBR copolymers that are the subject matters of the present invention and formulations taught in the state of the art.

TABLE 1

Comparative properties of the compositions contained in the examples

| Components | | Example A | Example A1 | Example B | Example B1 |
|---|---|---|---|---|---|
| SBR | | 10% | 10% | 10% | 10% |
| Phenolic antioxidant | | 1% | 1% | 1% | 1% |
| Glycerol ester | | 10% | 10% | — | — |
| Phenolic terpene | | — | — | 7% | 7% |
| Aromatic hydrocarbon | | — | — | 3% | 3% |
| Toluene | | 79% | 79% | 79% | 79% |
| Characteristics of the SBR | | | | | |
| Combined styrene (%) | | 55 | 23.5 | 55 | 23.5 |
| Mooney viscosity (MML1 + 4@100° C.) | | 120 | 52 | 120 | 52 |
| Properties of the Adhesives | | | | | |
| Solids content(%) | | 20.0 | 20.0 | 20.0 | 20.0 |
| Viscosity (Brookfield RVT) | | 5,500 | 1,300 | 8,400 | 1,900 |
| Peel strength (N/mm) | PVC vs NYLON | 8.5 | 0.9 | 13.7 | 1.4 |
| | PVC vs PP | 2.4 | 0.3 | 3.0 | 0.2 |
| Shear strength (N/mm$^2$) | PVC vs NYLON | 0.3 | 0.1 | 0.4 | 0.1 |
| | PVC vs PP | 0.3 | 0.1 | 0.4 | 0.1 |
| | MDF vs PVC | 0.57 | 0.01 | 0.97 | 0.02 |

An analysis of table 1 reveals the synergist effect caused by the high content of combined styrene and high Mooney viscosity which favor the cohesion property. Additionally, the presence of the resinous acid incorporated in the copolymer and the high polymerization temperature, responsible for the presence of ramifications in the copolymer, favor the adhesion property. All these factors added together provide high performance of the adhesive composition, reflected in the excellent results of the peel strength and shear strength tests, far superior than the results obtained with the conventional SBR.

From a comparison of the data in Table 1, it can easily be noted that the balance of adhesion/cohesion properties could only have been achieved by the specific molecular design of the present invention, which associated these four key parameters: high content of combined styrene, high Mooney viscosity, presence of resinous acid incorporated in the copolymer and control of the ramifications, defined by the polymerization temperature.

The present invention has been described with reference to specific details of particular embodiments thereof. It is not intended that such details be regarded as limitations upon the scope of the invention except insofar as and to the extent that they are included in the accompanying claims. As used in this specification and the appended claims, the singular forms "a," "an," and "the" include plural referents unless the content clearly dictates otherwise.

What is claimed is:

1. A process for preparing a styrene-butadiene copolymer, comprising the steps of:
   polymerizing, via aqueous emulsion polymerization, styrene-butadiene copolymer reactants, said reactants comprising styrene monomer, butadiene monomer, and a chain transfer agent,
   wherein said polymerizing is performed at a temperature between 40° C. and 65° C. and a Mooney viscosity of between 85 and 150, and in the presence of a resinous soap emulsifier,
   whereby forming a styrene-butadiene copolymer latex wherein the total solids content thereof is maintained in the range of 20-40% where the polymerization is terminated after 60%-80% conversion of the starting reactants via the addition of a reaction terminator; and wherein
   said resinous soap emulsifier being incorporated into the styrene-butadiene copolymer in its acid form, and
   further wherein said styrene-butadiene copolymer has a styrene content of between 45 and 75%.

2. The process according to claim 1, wherein the polymerizing occurs at temperatures between 45° C. and 60° C. until a styrene-butadiene copolymer latex is formed,
   wherein said latex has a Mooney viscosity in the range of 100-130 and a total solids content in the range of 22 to 30%.

3. The process according to claim 1, wherein the temperature is between 45° C. and 60° C.

4. The process according to claim 1, wherein the Mooney viscosity is between 100 and 130.

5. The process according to claim 1, wherein the styrene content is between 45 and 65%.

6. The process according to claim 1, wherein the styrene content is between 50 and 60%.

7. The process according to claim 1, further comprising:
   providing a reactor for said polymerizing step and purging the reactor with gaseous nitrogen to completely remove oxygen from therein;
   adding a preheated emulsifier to said polymerizing step at a temperature in the range of 40° C.-60° C.;
   preparing a free radical initiator solution and adding said free radical initiator solution during said polymerizing step;
   forming a styrene-butadiene copolymer latex wherein the total solids content thereof is maintained in the range of 20-40%;
   terminating the polymerizing after 60%-80% conversion of the starting reactants via the addition of a reaction terminator;

removing unreacted butadiene monomer and styrene monomer; coagulating the latex via the addition of a coagulant; and washing and drying the styrene-butadiene copolymer.

8. The process according to claim 7, wherein the total solids content is in the range of 20 to 40%.

9. The process according to claim 7, wherein the total solids content is between 22 and 30%.

* * * * *